United States Patent
Yanagisawa et al.

(10) Patent No.: US 8,331,521 B2
(45) Date of Patent: Dec. 11, 2012

(54) DIGITAL PROCESSING MONITORING DEVICE

(75) Inventors: Masataka Yanagisawa, Tokyo (JP); Toshifumi Sato, Tokyo (JP)

(73) Assignee: Kabushiki Kaisha, Tokyo (JP)

( * ) Notice: Subject to any disclaimer, the term of this patent is extended or adjusted under 35 U.S.C. 154(b) by 25 days.

(21) Appl. No.: 12/957,991

(22) Filed: Dec. 1, 2010

(65) Prior Publication Data

US 2012/0007634 A1    Jan. 12, 2012

Related U.S. Application Data

(63) Continuation-in-part of application No. PCT/JP2009/002429, filed on Jun. 1, 2009.

(30) Foreign Application Priority Data

Jun. 2, 2008 (JP) .................................. 2008-144554

(51) Int. Cl.
    *G21C 17/10* (2006.01)
(52) U.S. Cl. ........... 376/259; 376/254; 376/246; 326/37
(58) Field of Classification Search .................. 376/254, 376/217, 216, 259, 242, 245–247, 255, 210, 376/211; 326/37–41
    See application file for complete search history.

(56) References Cited

U.S. PATENT DOCUMENTS

| | | | | |
|---|---|---|---|---|
| 3,998,694 | A | * | 12/1976 | Luger ............................. 376/217 |
| 4,770,841 | A | * | 9/1988 | Haley et al. .................... 376/216 |
| 5,930,317 | A | * | 7/1999 | Kono .............................. 376/259 |
| 6,516,041 | B1 | * | 2/2003 | Curreri .......................... 376/217 |
| 6,801,027 | B2 | * | 10/2004 | Hann et al. .................... 323/282 |
| 7,051,057 | B2 | | 5/2006 | Ohno et al. |

FOREIGN PATENT DOCUMENTS

| | | | |
|---|---|---|---|
| JP | 09-044203 | A | 2/1997 |
| JP | 2001-305187 | A | 10/2001 |
| JP | 2002-006907 | A | 1/2002 |
| JP | 2002006907 | * | 1/2002 |
| JP | 2002-222003 | A | 8/2002 |
| JP | 2003-229760 | A | 8/2003 |
| JP | 2003229760 | * | 8/2003 |
| JP | 2004-354166 | A | 12/2004 |
| JP | 2004354166 | * | 12/2004 |
| JP | 2007-003399 | A | 1/2007 |
| JP | 2007003399 | * | 1/2007 |
| WO | WO 0244821 | * | 6/2002 |

OTHER PUBLICATIONS

Translation of International Preliminary Report on Patentability of PCT/JP2009/002429, dated Jan. 20, 2011, 8 pages.

* cited by examiner

*Primary Examiner* — Vibol Tan

(74) *Attorney, Agent, or Firm* — Foley & Lardner LLP

(57) ABSTRACT

According to an embodiment, a digital process type monitor device includes a plurality of modules and a mother board connected to each of the modules. Each module includes: a base board connected to a connector and having an FPGA for main control and an IPGA for sub board control mounted thereon; and a sub board for a main-machine I/F process, having an FPGA for an I/F process mounted hereon. Each sub board has storage devices for storing man-machine I/F information on the sub board. Each of the FPGA writes transmission data into a predetermined region of a transmission area and has a common transmission protocol to share the transmission data between the respective modules.

7 Claims, 4 Drawing Sheets

DIGITAL PROCESSING MONITORING DEVICE

CROSS REFERENCES TO RELATED APPLICATIONS

This application is a continuation-in-part (CIP) application based upon the International Application PCT/JP2009/002429, the International Filing Date of which is Jun. 1, 2009, the entire content of which is incorporated herein by reference, and is based upon and claims the benefits of priority from the prior Japanese Patent Application No. 2008-144554, filed in the Japanese Patent Office on Jun. 2, 2008, the entire content of which is incorporated herein by reference.

FIELD

Embodiments described herein relates to a digital processing monitoring device and particularly to a digital processing monitoring device suitable for monitoring the output power of a nuclear reactor.

BACKGROUND

For a boiling-water nuclear reactor, what has been developed in recent years is a device in which FPGA (field programmable gate array) is applied to a power range monitor (PRM), which is used to measure a neutron flux inside a nuclear reactor in power outputting operation state, a startup range neutron monitor (SRNM) and the like. The FPGA is a type of integrated logic element that can write a unique logic circuit.

As shown in FIG. 2, an average power range monitor (APRM), a local power range monitor (LPRM) and the like that make up the above-described power range monitor (PRM) make up modules, each of which is made up of a variety of boards. The components as a whole make up a digital processing monitoring device that monitors the output power of a nuclear reactor. The digital processing monitoring device is made up of a plurality of modules (See Japanese Patent Application Laid-Open Publication No. 2007-3399, the entire content of which is incorporated herein by reference.).

In the case of conventional modules, boards have been developed for each module. Therefore, maintenance and inspection are required for each module. Thus, a board used in a given module cannot be applied to another module. Accordingly, for example, when it is found as a result of the maintenance and inspection of a module that it is necessary to replace a board, a board for the above-described module needs to be used. Therefore, various types of replacement board need to be prepared in accordance with the types of the modules. Thus, maintenance and inspection are complex and expensive.

Therefore, the object of the present invention is to provide a digital processing monitoring device with improved economic efficiency and maintainability in which the number of types of board required is reduced thanks to versatile boards.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION

Figure 1:
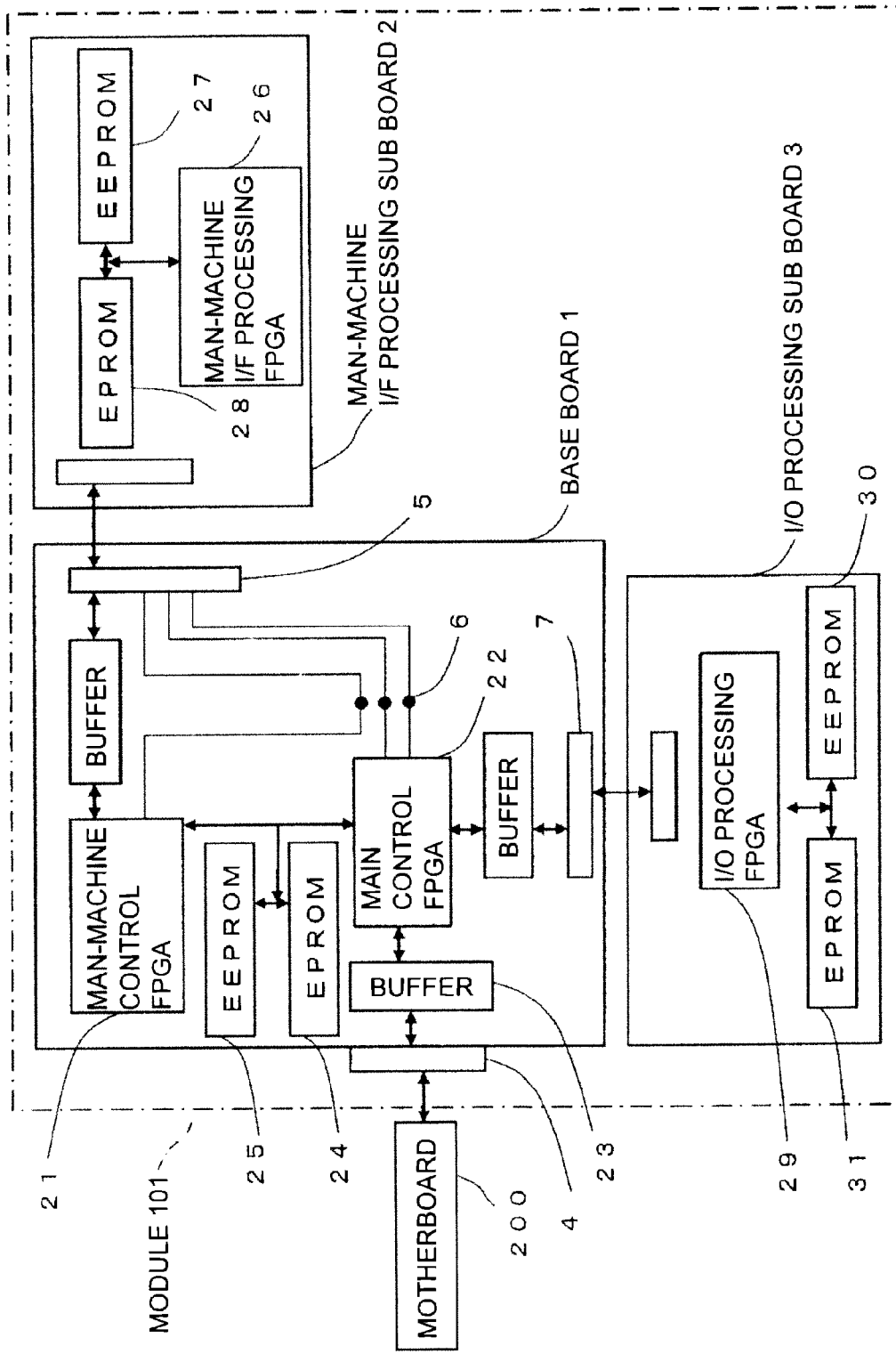
FIG. 1 is a diagram illustrating the configuration of a digital processing monitoring device according to a first embodiment of the present invention.

In order to solve the above-described problem, according to an aspect of the present invention, there is provided a digital processing monitoring device comprising: a plurality of modules, each of which includes a base board mounted with a main control FPGA and a control FPGA of a sub board and connected to a connector and a man-machine I/F processing sub board mounted with an I/F processing FPGA; and a motherboard connected to each of a plurality of the modules, wherein: each sub board of the plurality of the modules is mounted with a storage device that stores man-machine I/F information of the sub board; and each FPGA of the plurality of the modules writes transmission data to a predetermined region of a transmission area and has a common transmission protocol to share transmission data between modules.

According to another aspect of the present invention, there is provided a digital processing monitoring device comprising: a plurality of modules, each of which includes a base board mounted with a main control FPGA and a control FPGA of a sub board and connected to a connector and a man-machine I/F processing sub board; and a motherboard connected to each of the plurality of the modules, wherein each base board of the plurality of the modules is mounted with a storage device that stores man-machine I/F information of the sub board.

According to yet another aspect of the present invention, there is provided a digital processing monitoring device comprising: a plurality of modules, each of which includes a base board mounted with a main control FPGA and connected to a connector and an I/O processing sub board mounted with an I/O processing FPGA and an input/output element; and a motherboard connected to each of the plurality of the modules, wherein: each sub board of the plurality of the modules is mounted with a storage device that stores I/O information associated with the outside of the sub board; and each FPGA of the plurality of the modules writes transmission data to a predetermined region of a transmission area and has a common transmission protocol to share transmission data between the modules.

According to yet another aspect of the present invention, there is provided a digital processing monitoring device comprising: a plurality of modules, each of which includes a base board mounted with a main control FPGA and connected to a connector and an I/O processing sub board mounted with an I/O processing FPGA and an input/output element; and a motherboard connected to each of the plurality of the modules, wherein: at least one of the sub boards of the plurality of the modules is mounted with an input/output element and is not mounted with any of an I/O processing FPGA, an EPROM and an EEPROM; a main control FPGA of the base board of the module has a function of performing an external input/output process; and each FPGA of the plurality of the modules writes transmission data to a predetermined region of a transmission area and has a common transmission protocol to share transmission data between modules.

The following describes a digital processing monitoring device according to an embodiment of the present invention, with reference to the accompanying drawings. The same or similar components are represented by the same symbols and will not be repeatedly described.

First Embodiment

A first embodiment of the present invention will be described with reference to FIGS. 1 and 2.

Figure 2:
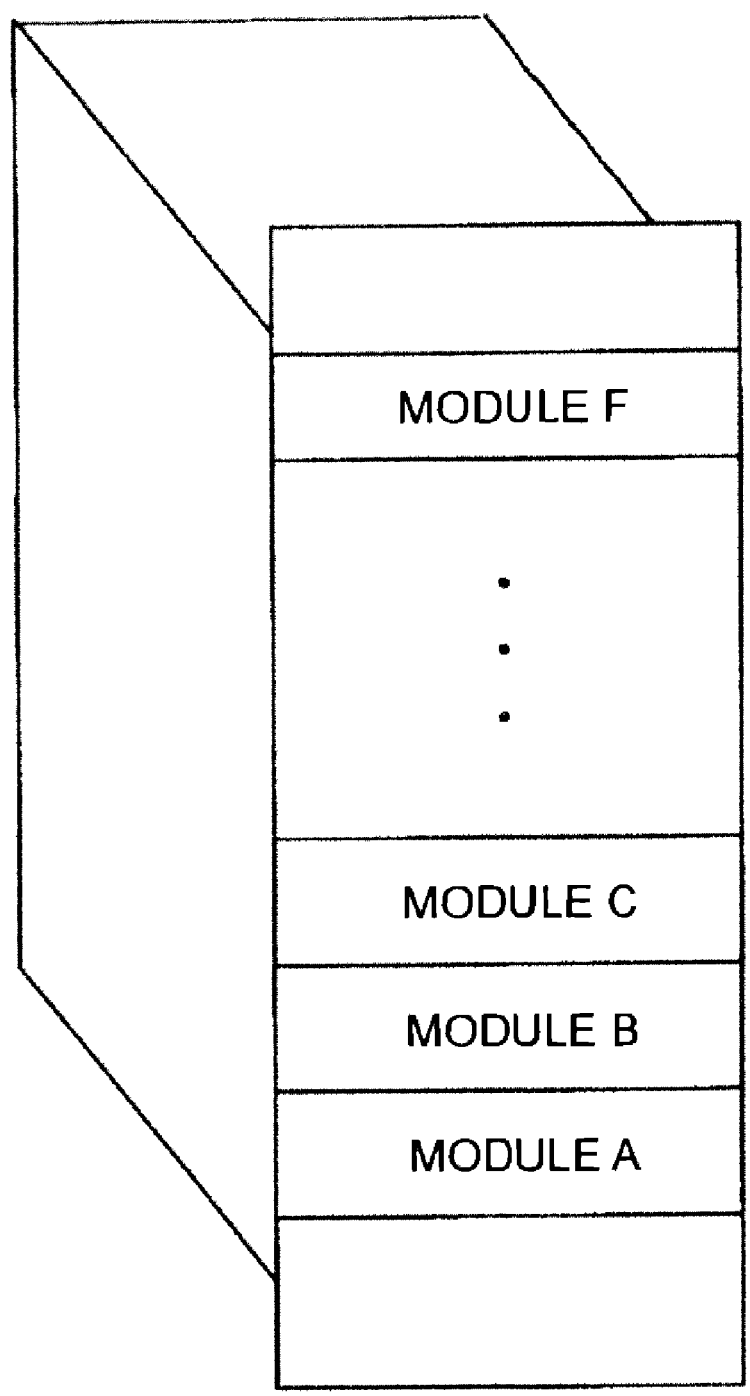
FIG. 2 is a diagram illustrating the configuration of a digital processing monitoring device made up of a plurality of modules.

In general, as shown in FIG. 2, a monitoring device that monitors a neutron flux in a nuclear reactor is made up of a plurality of modules. For example, the monitoring device is made up of a plurality of modules including an average power range monitor (APRM), which serves as a module A, a local power range monitor (LPRM), which serves as a module B, an I/O (Input/Output) module, which serves as a module C, and the like.

FIG. 1 shows an example of the configuration of one of the modules, a module 101. The module 101 includes a base board 1, which is connected to a connector 4 that is connected to a motherboard 200; a man-machine I/F (Interface) processing sub board 2, which is connected to the base board 1 through a sub board connection I/F 5; and an I/O processing sub board 3, which connects to the base board 1 through a sub board connection I/F 7. The base board 1 and the sub boards 2 and 3 are connected through power supply lines and transmission lines.

The base board 1 includes a man-machine control FPGA 21, a main control FPGA 22, an external interface buffer 23, an EEPROM (Electrically Erasable and Programmable Read-Only Memory) 24 for storing parameters that can change, an EPROM (Erasable Programmable Read-Only Memory) 25 for storing parameters that do not change such as initial data, and the like.

Similarly, on the man-machine I/F processing sub board 2, a man-machine I/F processing FPGA 26, an EEPROM 27 and an EPROM 28 are provided. On the I/O processing sub board 3, an I/O processing FPGA 29, an EEPROM 30 and an EPROM 31 are provided.

In order for transmission to be performed between the boards, the FPGAs 22, 26 and 29 each allocate transmission areas to which data is written. The contents of transmission areas are for example divided into the following five areas (A1) to (A5).

(A1) Base board main control writing data area
(A2) Base board man-machine control writing data area
(A3) Man-machine I/F processing data area
(A4) I/O processing data area
(A5) Other module information writing data area Since the contents of the allocated transmission areas are shared, the FPGAs 22, 26 and 29 each make reference to required data to perform a man-machine I/F process and an I/O process.

For example, when the sub board is the man-machine I/F processing sub board 2, a table where data that are exchanged with the sub board 2 is written is configured in the same specifications as memories and registers. The following man-machine I/F information is allocated to the table: whether a first LED (Light Emitting Diode) (not shown) is used or not; whether a second LED (not shown) is used or not; whether the first LED is displayed or not; whether the second LED is displayed or not; whether a first switch (not shown) is used or not; and whether a second switch (not shown) is used or not. Therefore, it becomes possible to transmit data in similar transmission formats even to any sub boards that are different in the number of LEDs or switches. Data can be similarly transmitted even if the data is serial or parallel data.

Even when the sub board is the I/O processing sub board 3, a channel is similarly allocated. Even if the sub boards are different in the number of digital inputs/outputs and the like, it is possible to transmit.

According to the present first embodiment, the base board 1, the man-machine I/F processing sub board 2 and the I/O processing sub board 3 are each mounted with FPGAs. Each FPGA allocates transmission areas to which data is written. The contents of the allocated transmission areas are shared. Therefore, it is possible for each FPGA to perform the man-machine I/F process and the I/O process by referring to required data. As a result, even if the configuration of the sub board is changed, it is possible to realize an input/output module and man-machine I/F module for an external portion that supports the change.

For example, a transmission/display process on the man-machine I/F processing sub board 2 is performed based on the EPROM (or EEPROM) on the sub board that stores man-machine I/F information, such as the status of whether the switches of the sub board 2 is used or not, and the LED display status. Therefore, the process by the FPGA of the sub board 2 is uniquely determined, and the versatility of the boards 1 to 3 is further improved. As a result, even when a module goes wrong, it is possible to promptly conduct maintenance, repair and inspection operations such as replacing boards because the boards are very versatile.

The module 101 of the present first embodiment includes the base board 1, the man-machine I/F processing sub board 2, and the I/O processing sub board 3. However, the I/O processing sub board 3 is not indispensable. That is, the module may be made up of the base board 1 and the man-machine I/F processing sub board 2. Even in this case, similar effects to those described above can be obtained.

Second Embodiment

According to the above-described first embodiment, the FPGA is mounted on each of the boards 1 to 3. According to the present second embodiment, the FPGAs are not mounted on the sub boards 2 or 3, but only on the base board 1 (not shown).

In this case, for example, a transmission/display process on the man-machine I/F processing sub board 2 is performed based on the EPROM (or EEPROM) on the base board that stores man-machine I/F information, such as the status of whether the switches of the sub board 2 or the LEDs are used or not.

According to the present second embodiment, the process by the FPGA of the base board 1 is uniquely determined, and the versatility of the base and sub boards is further improved.

Third Embodiment

According to the present third embodiment, provided is a diagnosis sub board (not shown) to confirm and grasp the state of the base board 1 and information inside a data transmission area. That is, as shown in FIG. 1, test pins 6 are connected to the FPGAs 21 and 22 of the base board 1 and transmit the state information of the base board 1 and the information inside a data transmission area to the diagnosis sub board through the sub board connection I/F 5.

According to the present third embodiment, it is possible to grasp the state of the I/O sub board and other modules from the state of the base board 1 and the information inside a data transmission area, making it possible to carry out a diagnosis of each board inside a module.

Fourth Embodiment

A fourth embodiment of the present invention will be described with reference to FIG. 3.

Figure 3:
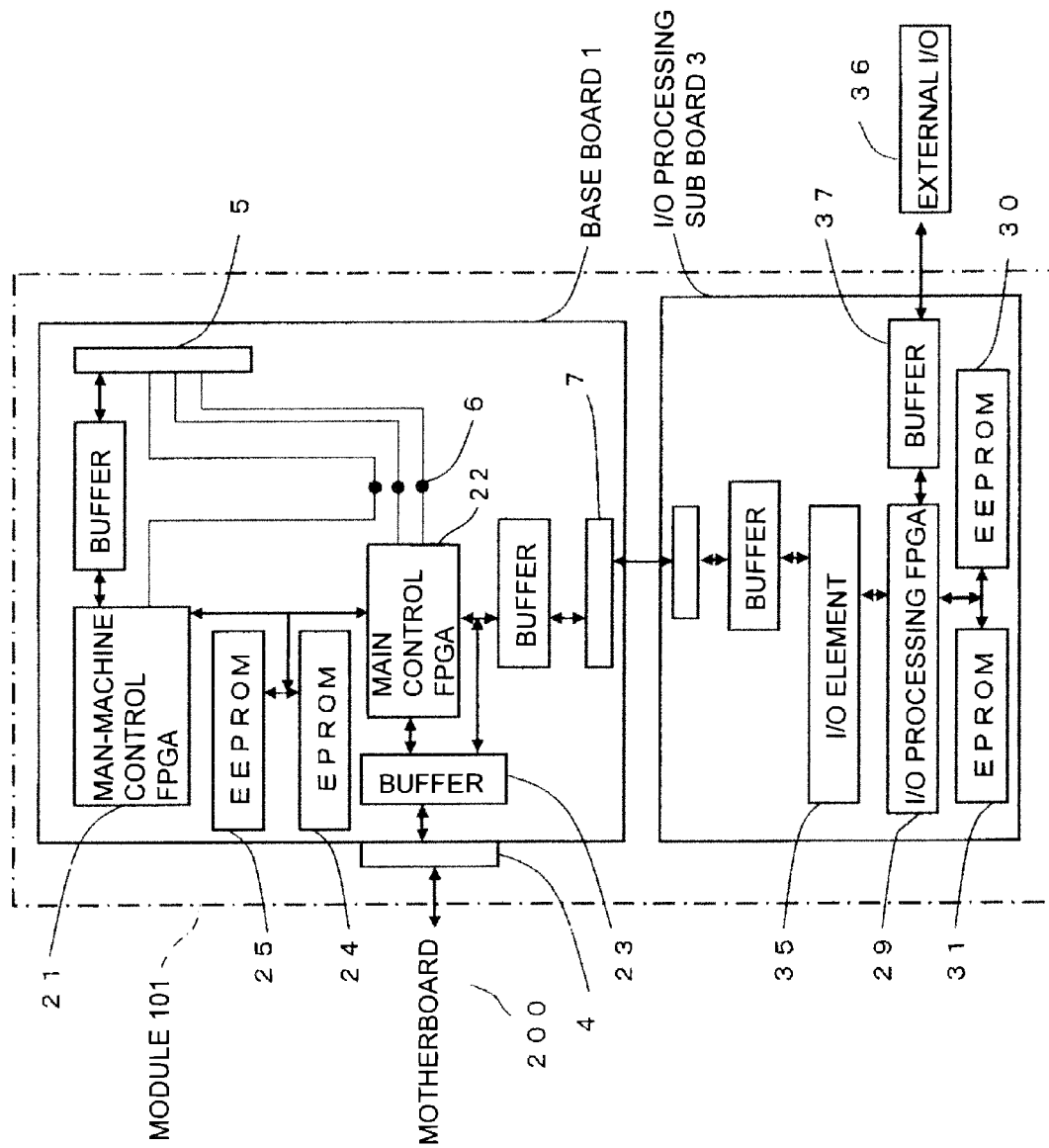
FIG. 3 is a diagram illustrating the configuration of a digital processing monitoring device according to a fourth embodiment of the present invention.

In a module 101 of FIG. 3, the I/O processing FPGA 29 of the sub board 3 stores the state of an input signal from the outside that an I/O element 35 of the sub board 3 has accepted and informs the FPGA 22 of the base board 1 of the input state (an input process from the outside). The base board 1 transmits external output request information to the sub board 3. In the I/O processing FPGA 29 of the sub board 3, a signal process is performed to output to the outside (an output process to the outside). The base board 1 and the sub board 3 are connected together with a plurality of signal lines to convey information.

In the case of contact input:

A module is realized in which: on the I/O processing sub board, for signals of an external I/O 36 (a contact input of a plurality of channels, for example), the input state of the contact is detected in the I/O processing FPGA 29 through a buffer 37 and the I/O element 35 (where a plurality of photo-couplers is mounted); the input state of the contact is transmitted to the base board 1 using parallel signals or bit-sequence ON/OFF serial signals; and a signal process is performed in the main control FPGA 22.

In the case of contact output:

In order to conduct the contact output of the external I/O 36, which is for example a plurality of channels, a module is realized in which: a request from the FPGA 22 of the base board 1 is received by the I/O processing FPGA 29 of the sub board 3 (using parallel or serial signals); and contact output is performed to the outside through the I/O element 35 (where a plurality of photo-MOS relays are mounted) and a buffer.

In the case of analog input (1):

When an external I/O, which is for example an electric current, comes in, a module is realized in which: with the I/O processing FPGA 29 of the sub board 3 being equipped with an A/D conversion function, digitized input data is transmitted to the base board 1 (An input level is transmitted with parallel or serial signals); and a signal process is performed in the main control FPGA 22.

In the case of analog input (2):

In the above-described analog input (1), a module is realized in which: with an A/D conversion element being mounted on the I/O element 35, digitized data is received by the I/O processing FPGA 29 of the sub board 3 and transmitted to the base board 1; and a signal process is performed in the main control FPGA 22.

In the case of analog output (1):

A module is realized in which: in response to a request from the base board 1, the I/O processing FPGA 29 of the sub board 3 is equipped with a D/A conversion function, and analog output is performed to the outside.

In the case of analog output (2):

In the above-described analog output (1), a module is realized in which: with a D/A conversion element being mounted on the I/O element 35, analog output is performed from the I/O processing FPGA 29 of the sub board 3 through a D/A converter and a buffer in response to a request from the base board 1.

In the case of external transmission input/output (RS488, for example):

A module is realized in which: when serial signal data enters the external I/O 36, the I/O processing FPGA 29 of the sub board 3 is equipped with a signal processing I/F function of the base board 1, and an input/output process of external transmission input/output is performed.

It is also possible to realize a module having a plurality of I/O functions in the I/O processing FPGA 29 where a plurality of the above-described external I/O functions are mounted in accordance with a function table set in the EPROM 31 or EEPROM 30.

Incidentally, according to the present embodiment, the man-machine control FPGA 21 of FIG. 3 is not indispensable.

Fifth Embodiment

A fifth embodiment of the present invention will be described with reference to FIG. 4.

In a module 102 of the present embodiment, an I/O element 40 is mounted instead of the I/O processing FPGA 29 of the sub board 3 of the fourth embodiment (FIG. 3); the main control FPGA 22 of the base board 1 is equipped with a data processing function. In this manner, an I/O module is realized.

In the case of contact input (a photo coupler is mounted as the I/O element 40):

A photo coupler is mounted in the I/O element 40 of a sub board 3a. An arithmetic process of an input signal from the photo coupler is performed in the FPGA 22 of the base board 1. Therefore, it is possible to realize a module that performs an external contact input process.

In the case of contact output (a photo-MOS relay is mounted as the I/O element 40):

A photo-MOS relay is mounted in the I/O element 40 of the sub board 3a. The FPGA 22 of the base board 1 is equipped with a function of making the photo-MOS relay perform contact output. Therefore, it is possible to realize an external contact output module.

Analog input (an A/D conversion element is mounted as the I/O element 40):

An A/D conversion element is mounted in the I/O element 40 of the sub board 3a. The FPGA 22 of the base board 1 is equipped with a function of performing an input process of data from the A/D conversion element. Therefore, it is possible to realize an analog input module.

Analog output (a D/A conversion element is mounted as the I/O element 40):

A D/A conversion element is mounted in the I/O element 40 of the sub board 3a. The FPGA 22 of the base board 1 is equipped with a function of performing an output process of data to the D/A conversion element. Therefore, it is possible to realize an analog output module.

External transmission (RS488, for example) (An RS485 transmission processing element is mounted as the I/O element 40):

An RS485 transmission processing element is mounted in the I/O element 40 of the sub board 3a. The FPGA 22 of the base board 1 is equipped with a function of processing input/output data of transmission data. Therefore, it is possible to realize an external transmission module.

Figure 4:
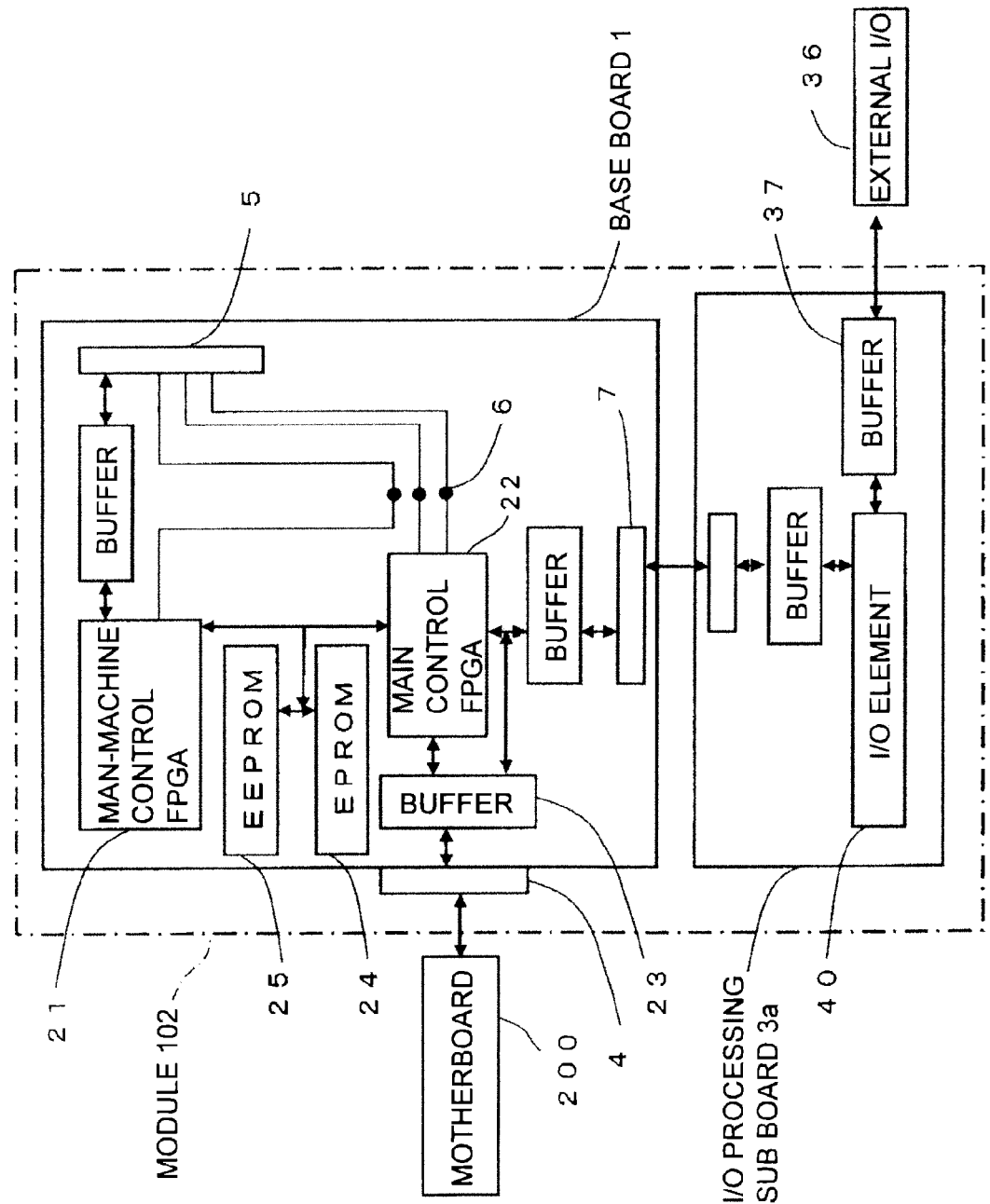
FIG. 4 is a diagram illustrating the configuration of a digital processing monitoring device according to a fifth embodiment of the present invention.

Incidentally, according to the present embodiment, the man-machine control FPGA 21 of FIG. 4 is not indispensable.

What is claimed is:

1. A digital processing monitoring device comprising:
a plurality of modules, each of which includes a base board mounted with a main control FPGA and a control FPGA of a sub board and connected to a connector and a man-machine I/F processing sub board mounted with an I/F processing FPGA; and a motherboard connected to each of a plurality of the modules, wherein:

each sub board of the plurality of the modules is mounted with a storage device that stores man-machine I/F information of the sub board; and each FPGA of the plurality of the modules writes transmission data to a predetermined region of a transmission area and has a common transmission protocol to share transmission data between modules.

2. A digital processing monitoring device comprising:

a plurality of modules, each of which includes a base board mounted with a main control FPGA and connected to a connector and an I/O processing sub board mounted with an I/O processing FPGA and an input/output element; and a motherboard connected to each of the plurality of the modules, wherein:

each sub board of the plurality of the modules is mounted with a storage device that stores I/O information associated with the outside of the sub board; and each FPGA of the plurality of the modules writes transmission data to a predetermined region of a transmission area and has a common transmission protocol to share transmission data between the modules.

3. A digital processing monitoring device comprising:

a plurality of modules, each of which includes a base board mounted with a main control FPGA and connected to a connector and an I/O processing sub board mounted with an I/O processing FPGA and an input/output element; and a motherboard connected to each of the plurality of the modules, wherein;

at least one of the sub boards of the plurality of the modules is mounted with an input/output element and is not mounted with any of an I/O processing FPGA, an EPROM and an EEPROM;

a main control FPGA of the base board of the module has a function of performing an external input/output process; and each FPGA of the plurality of the modules writes transmission data to a predetermined region of a transmission area and has a common transmission protocol to share transmission data between modules.

4. The digital processing monitoring device according to claim 1, further comprising a diagnosis sub board that can be connected to and detached from the FPGA of the base board of at least one of the plurality of the modules and carry out a diagnosis after receiving the state of the base board and information inside a data transmission area when being connected.

5. A digital processing monitoring device comprising:

a plurality of modules, each of which includes a base board mounted with a main control FPGA and a control FPGA of a sub board and connected to a connector and a man-machine I/F processing sub board;

a motherboard connected to each of the plurality of the modules; and a diagnosis sub board that can be connected to and detached from the FPGA of the base board of at least one of the plurality of the modules and carry out a diagnosis after receiving the state of the base board and information inside a data transmission area when being connected, wherein each base board of the plurality of the modules is mounted with a storage device that stores man-machine I/F information of the sub board.

6. The digital processing monitoring device according to claim 2, further comprising a diagnosis sub board that can be connected to and detached from the FPGA of the base board of at least one of the plurality of the modules and carry out a diagnosis after receiving the state of the base board and information inside a data transmission area when being connected.

7. The digital processing monitoring device according to claim 3, further comprising a diagnosis sub board that can be connected to and detached from the FPGA of the base board of at least one of the plurality of the modules and carry out a diagnosis after receiving the state of the base board and information inside a data transmission area when being connected.

* * * * *

UNITED STATES PATENT AND TRADEMARK OFFICE
CERTIFICATE OF CORRECTION

PATENT NO. : 8,331,521 B2
APPLICATION NO. : 12/957991
DATED : December 11, 2012
INVENTOR(S) : Masataka Yanagisawa and Toshifumi Sato It is certified that error appears in the above-identified patent and that said Letters Patent is hereby corrected as shown below:

ON THE TITLE PAGE

The Assignee Data should read as:

Item (73)   KABUSHIKI KAISHA TOSHIBA, Tokyo (JP)

Signed and Sealed this
Fifth Day of February, 2013

Teresa Stanek Rea
*Acting Director of the United States Patent and Trademark Office*